US007489887B2

(12) United States Patent
Marumoto

(10) Patent No.: US 7,489,887 B2
(45) **Date of Patent: *Feb. 10, 2009**

(54) SUPPORT STRUCTURE FOR IMAGE PROCESSING APPARATUS

(75) Inventor: Takeshi Marumoto, Osaka (JP)

(73) Assignee: Kyocera Mita Corporation, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/935,446

(22) Filed: Nov. 6, 2007

(65) Prior Publication Data

US 2008/0044199 A1 Feb. 21, 2008

Related U.S. Application Data

(60) Continuation of application No. 11/550,006, filed on Oct. 17, 2006, which is a division of application No. 10/874,919, filed on Jun. 23, 2004, now Pat. No. 7,123, 856.

(30) Foreign Application Priority Data

Jun. 25, 2003 (JP) ............................ 2003-180701
Oct. 28, 2003 (JP) ............................ 2003-367661

(51) Int. Cl.

| | |
|---|---|
| ***G03G 15/00*** | (2006.01) |
| ***A47B 91/00*** | (2006.01) |
| ***F16M 11/00*** | (2006.01) |
| ***B41J 29/13*** | (2006.01) |
| ***B41J 2/41*** | (2006.01) |

(52) U.S. Cl. ................ 399/107; 248/188.8; 248/188.9; 248/677; 347/108; 347/152

(58) Field of Classification Search ................ 399/107; 174/50; 248/188.8, 188.9, 677; 312/351.1, 312/351.2, 351.3; 347/108, 138, 152
See application file for complete search history.

(56) References Cited

U.S. PATENT DOCUMENTS 763,306 A 6/1904 Miller (Continued)

FOREIGN PATENT DOCUMENTS

JP 38-10156 A 3/1936

(Continued)

*Primary Examiner*—Sandra L Brase
(74) *Attorney, Agent, or Firm*—Panitch Schwarze Belisario & Nadel LLP

(57) ABSTRACT

A support structure for an image processing apparatus is disclosed. The apparatus has an apparatus body, a base provided at a lower portion of the apparatus body for supporting the body, and an image processing unit disposed inside the apparatus body or attached thereto. The processing unit is capable of effecting at least either an image forming operation or an image reading operation. The support structure includes a grounding portion formed at and integrally with a bottom of the apparatus base for coming into contact with a contact-object surface such as a floor surface at at least three positions thereof thereby to support the base parallel with the contact-object surface and includes also an elastic projecting portion formed of a material having greater elasticity than a material forming the grounding portion. The elastic projecting portion has a ground-contacting face which projects from a bottom face of the grounding portion under a non-grounded condition of the support structure. Under a grounded condition of the support structure, the elastic projecting portion is elastically deformed, so that the grounding portion is allowed to come into contact with the contact-object surface at at least three positions and also the ground-contacting face contacts the contact-object surface, thereby to together support the base of the apparatus body on the contact-object surface.

4 Claims, 10 Drawing Sheets

U.S. PATENT DOCUMENTS

| | | | |
|---|---|---|---|
| 1,400,781 | A | 12/1921 | Wagner, Jr. |
| 1,886,740 | A | 11/1932 | Richardson |
| 2,281,136 | A | 4/1942 | Beverlin |
| 2,875,552 | A | 3/1959 | Stillman |
| 4,396,177 | A | 8/1983 | Liebl |
| 4,789,876 | A | 12/1988 | Miyai et al. |
| 4,923,158 | A | 5/1990 | Saisho |
| 5,153,052 | A | 10/1992 | Tanaka et al. |
| 5,191,382 | A | 3/1993 | Okamura et al. |
| 5,298,917 | A | 3/1994 | Deguchi et al. |
| 5,881,340 | A | 3/1999 | Stickney et al. |
| 6,466,753 | B2 | 10/2002 | Kida |
| 6,473,152 | B1 | 10/2002 | Yokota |
| 6,669,153 | B1 | 12/2003 | Allan |
| 7,123,856 | B2 * | 10/2006 | Marumoto .................. 399/107 |

FOREIGN PATENT DOCUMENTS

| | | | |
|---|---|---|---|
| JP | 55-18223 | Y2 | 4/1980 |
| JP | 60-2432 | U | 1/1985 |
| JP | 61-75226 | U | 5/1986 |
| JP | 61-155202 | U | 9/1986 |
| JP | 63-152276 | U | 10/1988 |
| JP | 64-5068 | A | 1/1989 |
| JP | 4-115431 | A | 4/1992 |
| JP | 04-333862 | A | 11/1992 |
| JP | 5-31740 | A | 2/1993 |
| JP | 6-10950 | U | 2/1994 |
| JP | 9-262985 | A | 10/1997 |
| JP | 9-289931 | A | 11/1997 |
| JP | 9-313281 | A | 12/1997 |
| JP | 10-5068 | A | 1/1998 |
| JP | 2578273 | Y2 | 5/1998 |
| JP | 10-178277 | A | 6/1998 |
| JP | 10-178278 | A | 6/1998 |
| JP | 2000-340959 | A | 12/2000 |
| JP | 2001-100474 | A | 4/2001 |
| JP | 2001-341377 | A | 12/2001 |
| JP | 2002-166621 | A | 6/2002 |
| JP | 2002-287452 | A | 10/2002 |

* cited by examiner (a)

(b)

SUPPORT STRUCTURE FOR IMAGE PROCESSING APPARATUS

CROSS-REFERENCE TO RELATED APPLICATIONS

This application is a Continuation of U.S. patent application Ser. No. 11/550,006, filed Oct. 17, 2006, which is in turn a Divisional of U.S. patent application Ser. No. 10/874,919, filed Jun. 23, 2004, now U.S. Pat. No. 7,123,856, the disclosures of which are incorporated herein by reference.

BACKGROUND OF THE INVENTION

The present invention relates to a support structure for use with an image processing apparatus. The apparatus includes an apparatus body, a base provided at a lower portion of the apparatus body for supporting the body, and an image processing unit disposed inside the apparatus body or attached thereto, the unit being capable of effecting at least either an image forming operation or an image reading operation. An example of the image processing apparatus of this type is a copier.

With an image processing apparatus of the above-noted type, in general, there are provided rubber supports in the form of short columns attached to the bottom of the apparatus body for supporting it. The present applicant previously proposed anchoring such rubber supports to the bottom with screws (e.g. Japanese utility model application "Kokai" No.: Hei. 06-10950).

Subsequent to the above, this applicant addressed the problem of flexion which occurs between the bottom portions supported by the respective rubber supports. Then, to overcome this problem, the applicant proposed providing a projection at an intermediate position where such flexion between the rubber supports is likely to occur (Japanese patent application "Kokai" No.: 2002-166621). Specifically, in one Example, the projection comprises a rigid hollow tubular member accommodating an elastic member therein. The elastic member is adapted to come into contact with the floor surface to support the apparatus body together with the rubber supports only when the apparatus body is moved downwardly in association with elastic deformation of the rubber supports. In this construction, the rubber supports are designed to come into contact with the floor surface before the elastic member comes into contact with the same. For this reason, under the non-grounded condition, the leading end of the elastic member is recessed (toward the apparatus body base) relative to the leading ends of the rubber supports.

When such rubber supports as above are employed, the rubber supports are usually provided at three or more positions on the bottom surface of the base. The use of the rubber material is for restricting slippage of the apparatus body even when it is mounted on a slippery surface such as a slippery floor or table surface while supporting the weight of the apparatus body. The use of the elastic material such as rubber provides another advantage of avoiding damage to material forming the other member or portion (e.g. the floor surface) to be placed in contact therewith.

However, if the support needed for the apparatus body relies solely on such rubber supports as above, it has been found that while the problem of slippage can be substantially solved, another problem tends to occur when they are used with a more recent type of image processing apparatus as will be detailed later.

Namely, when the rubber supports are employed, these supports, depending on the hardness of the material used therefor, will be compressively deformed in the vertical direction by the weight of the apparatus body. Such compressive deformation may not present any big problem in the case of an image processing apparatus not having an image reading function, such as a printer. Whereas, in the case of an image processing apparatus having the image reading function, in particular, a copier having a scanner, the optical reader unit or the scanner is mounted at a relatively upper portion of the apparatus body. Hence, the compressive deformation significantly affects the levelness and parallelism of the mounting surface for the optical unit located at such upper portion of the apparatus body. Accordingly, unless high precision is ensured in this respect, the optical reading unit per se will be physically distorted, thus resulting in distortion, impaired squareness of the image obtained thereby, etc.

In the case of more conventional apparatus, the center of gravity of the apparatus substantially coincides with the center of the apparatus body in plan view. In this case, its optical unit is not significantly affected. This is not the case with a more recent image processing apparatus which is referred to as "in-body discharge type" (wherein finished paper sheets or the like are discharged into a hollow space formed in the middle of the apparatus main body). This type of apparatus requires that a relatively heavy driving unit be mounted at a rear side of the apparatus body, in particular, with an offset toward its image fixing unit. The deviation of the gravity center in plan view results in non-negligible difference among the compressive deformation amounts of the rubber supports.

More particularly, in the case of such in-body discharge type apparatus, one rubber support located closest to the gravity center will be deformed by the greatest amount, whereas the other supports will not be compressed so largely. Hence, it has been found that the problem of the levelness and parallelism tends to occur conspicuously in the case of an apparatus having an apparatus body formed of a standard resin material.

This problem will be described in greater details with reference to a typical in-body discharge type apparatus. This apparatus has a total apparatus weight of 39 kg. The center of gravity is offset to the left rear side of the apparatus body. The apparatus body including its base is formed integrally of a resin material and rubber supports are arranged uniformly at four corners of the bottom face of the apparatus body.

The rubber supports are formed as rectangular columns (20×22×8.5 mm) made of ethylene propylene (EPDM) rubber having hardness of 60° as determined according to JIS (Japan Industrial Standard) K 6301 A. When attached to the bottom face of the apparatus, each support, under its uncompressed state (i.e. non-grounded condition), projects from the bottom surface of the apparatus body by 5 mm.

In use of the apparatus when mounted on a floor surface or the like, the rear left rubber support will be compressed by about 2 mm, while the rear right support and the front left support will be compressed by about 1 mm and the front right support will be compressed by about 0.5 mm. Because of these differences in the compression amounts, there occurs deviation from the levelness in the mounting surface for the optical reader unit corresponding to the differences.

On the other hand, if the apparatus body is supported directly on the mounting surface or the like without using the rubber supports attached thereto at the respective attaching positions thereof, both sufficient levelness and parallelism are ensured in the mounting surface for the optical unit.

With the prior art disclosed by Japanese patent application "Kokai" No.: 2002-166621 cited above, while it is possible to solve the problem of flexion between the supported positions of the base of the apparatus body, it is not possible to cope with the latter-mentioned problem of differing compression amounts among the respective rubber supports.

Further, for this type of rubber support, it is also important that the rubber support be not easily removed when a user drags the image processing apparatus body on the floor surface or lifts up the apparatus body therefrom after the body has been installed thereon for a long time. Namely, in order to ensure good use condition of the rubber supports for an extended period of time, it is required that the rubber supports be designed to effectively resist such inadvertent detachment thereof in case the apparatus body is dragged or lifted up after a long time installment.

BRIEF SUMMARY OF THE INVENTION

In view of the above-described state of the art, a primary object of the present invention is to provide an improved support structure for an image processing apparatus, which structure can ensure sufficient levelness and parallelism for the optical unit of the apparatus even when this apparatus has a deviated center of gravity and which can also effectively resist displacement or slippage of the apparatus body e.g. when the apparatus is mounted on a slippery surface such as a slippery floor or table surface.

When the structure employs such material as rubber for preventing slippage of the image processing apparatus, another object of the invention is to render the support structure effectively resistant against inadvertent detachment or removal of the rubber or the like when the image processing apparatus is dragged on its mounting surface or lifted up therefrom after the apparatus has been mounted thereon for a long period of time.

For accomplishing the above-noted objects, according to one aspect of the present invention, there is provided a support structure for an image processing apparatus having an apparatus body, a base provided at a lower portion of the apparatus body for supporting the body, and an image processing unit disposed inside the apparatus body or attached thereto, the unit being capable of effecting at least either an image forming operation or an image reading operation, the structure comprising:

a grounding portion formed at and integrally with a bottom of the apparatus base for coming into contact with a contact-object surface at at least three positions thereof thereby to support said base parallel with said contact-object surface;

an elastic projecting portion formed of a material having greater elasticity than a material forming said grounding portion;

said elastic projecting portion having a ground-contacting face which projects from a bottom face of said grounding portion under a non-grounded condition of the support structure; and under a grounded condition of the support structure, said elastic projecting portion being elastically deformed, so that said grounding portion is allowed to come into contact with the contact-object surface at said at least three positions and said ground-contacting face of the elastic projecting portion also contacts the contact-object surface, thereby to together support said base of the apparatus body on the contact-object surface.

With this support structure, under the grounded condition thereof, the apparatus frame (thus, the apparatus body) is uniformly supported on the contact-object surface (e.g. a floor surface) by the grounding portion (which is less elastic, i.e. more rigid than the elastic projecting portion). Also, under this grounded condition of the grounding portion, the ground-contact face of the elastic projecting portion too firmly contacts the contact-object surface with the elastic resilience thereof, thus providing anti-slippage function originally intended with the use of the elastic material.

Incidentally, when the image processing unit is disposed inside the apparatus body or attached to its upper portion, the problem of distortion or the like of the image to be formed addressed by the present invention will occur if the apparatus is mounted on a mounting surface (i.e. contact-object surface) with non-uniformity in its support condition at a plurality of supported positions of the apparatus body. In this respect, in the case of the invention's support structure, the grounding portion is formed integrally with the apparatus body of same relatively rigid material such as a resin forming the apparatus body. Hence, there occurs no such non-uniformity in the support condition. Thus, the apparatus or its image processing unit mounted thereon can effect its image forming operation under a favorable condition.

In particular, in case there exists deviation of the center of gravity of the apparatus body in its plan view, the above construction makes it possible to avoid this type of non-uniformity, thus allowing the apparatus to effect the image forming operation under the favorable condition.

Preferably, the elastic projecting portion is included in the grounding portion.

According to the essential concept of the present invention, there will occur no problem even if the elastic projecting portion and the grounding portion are provided independently of each other. However, if the elastic projecting portion is included in the grounding portion, the total number of portions involved in the grounding can be minimized, whereby the leveling operation of the apparatus is facilitated. In addition, the rigid grounding portion can provide effective support for the less rigid, i.e. elastic projecting portion.

Still preferably, in the above-described construction, the elastic supporting portion is retained under its compressed state by the grounding portion.

According to one example of this type of construction, the grounding portion defines an accommodating hole for accommodating and fixing the elastic projecting portion in position therein, so that the elastic projecting portion is press-fitted within the accommodating hole. With this, the elastic projecting portion will be fixed and retained in position, due to its resilience, relative to the grounding portion. Hence, a firm and reliably retained condition can be realized by effectively utilizing the resilience of the elastic material. Consequently, this construction can effectively reduce the possibility of inadvertent detachment when the apparatus body is dragged on the contact-object surface or lifted up off the surface after the apparatus body has been installed thereon for a long period of time.

In the above-described construction, preferably, between the grounding portion and the elastic projecting portion, there is provided a deformation-allowing gap for allowing deformation of the elastic projecting portion which occurs between the non-grounded condition and the grounded condition.

As described hereinbefore, with the elastic projecting portion provided in the invention's construction, it is essential that under its non-grounded condition, at least a portion of the elastic projecting portion project outward (or downward) from the bottom face of the grounding portion (projects away from the bottom of the apparatus body) and also that this portion become flush with at least the bottom face of the grounding portion under the grounded condition. Hence, if a gap which allows such amount of elastic deformation is provided between the grounding portion and the elastic projection portion, the elastic deformation which occurs between the non-grounded condition and the grounded condition of the elastic projecting portion can occur in a smooth manner. Consequently, the above-described objects of the present invention, i.e. the achievement and assurance of levelness, parallelism etc and the prevention of slippage can be achieved easily.

Preferably, a plurality of the elastic projecting portions are provided at different grounding portions and these elastic projecting portions have a same directional property in the material forming them with respect to a direction of the elastic deformation thereof.

With such same directional property of the forming material among the elastic projecting portions, it is possible to render the elastic deformation amounts thereof uniform when these projecting portions are grounded on the contact-object surface.

According to another aspect of the present invention, there is provided a support structure for an image processing apparatus having an apparatus body, a base provided at a lower portion of the apparatus body for supporting the body, and an image processing unit disposed inside the apparatus body or attached thereto, the unit being capable of effecting at least either an image forming operation or an image reading operation;

wherein said base includes a retaining portion which comes into contact with a contact-object surface;

said retaining portion retains an elastic projecting portion formed of an elastic material, with the elastic projecting portion being compressed therein.

In the case of this construction too, the elastic projecting portion can project from the bottom surface of the base under the non-compressed state. Whereas, under the compressed state, the elastic projecting portion can provide firm support for the base by means of the resilience thereof. Hence, with this construction too, it is possible to restrict occurrence of inadvertent detachment or removal when the image processing apparatus is dragged on its mounting surface or lifted up therefrom after the apparatus has been mounted thereon for a long period of time.

In this construction also, between the retaining portion and the elastic projecting portion, there can be provided a deformation-allowing gap for allowing deformation of the elastic projecting portion which occurs between the non-grounded condition and the grounded condition.

With the above, in the course of shift from the non-grounded condition to the grounded condition, the elastic projecting portion is elastically deformed and contacts the contact-object surface under this elastically deformed condition. Then, if a gap which allows such amount of elastic deformation is provided between the retaining portion and the elastic projection portion, the elastic deformation which occurs between the non-grounded condition and the grounded condition of the elastic projecting portion can occur in a smooth manner.

Preferably, a plurality of the elastic projecting portions are provided at different grounding portions and these elastic projecting portions have a same directional property in the material forming them with respect to a direction of the elastic deformation thereof.

In this case too, with such same directional property of the forming material among the elastic projecting portions, it is possible to render the elastic deformation amounts thereof uniform when these projecting portions are grounded on the contact-object surface.

The foregoing discussion about the ground-contacting face of the elastic projecting portion has been unconcerned about the specific shape of this ground-contacting face, i.e. whether the face may be a simple flat face (flat face parallel with the contact-object surface when attached to the base) or a face having a predetermined unevenness (uneven face in the direction close to or apart from the contact-object surface when attached to the base). However, according to one preferred mode of embodying the invention, the ground-contacting face of the elastic projecting portion is formed as a face having a predetermined unevenness relative to the direction closer to or apart from the contact-object surface, so that projections of this uneven ground-contacting face contact the contact-object surface under the grounded condition.

Namely, if the ground-contacting face of the elastic projecting portion is formed as a smooth flat face, when the image processing apparatus is mounted on an extremely smooth floor or table surface and a user lifts up this apparatus for transporting it, there is the possibility that the smooth and flat ground-contacting face of the elastic projecting portion may be firmly stuck to the smooth floor or table surface, so that the elastic projecting portion may be detached due to the suction effect. In the case of the construction of this elastic projecting portion being press-fitted, the possibility of such inadvertent detachment could be reduced by increasing the press-fitting force. This, however, would present difficulty in assembly.

On the other hand, with the construction where projections of the ground-contacting face come into contact with the contact-object surface under the grounded condition, including the construction providing the ground-contacting face with certain predetermined unevenness (such unevenness can be a predetermined pattern formed by roughing the surface or by effecting a knurling operation or formed as a wavelike uneven face as will be described in embodiments of the invention to follow or a face having simple rectangular block-like projections) (these substantially realize a “partially grounded” condition), such adhesion due to the suction effect can be relieved to some extent, thus restricting occurrence of inadvertent detachment in the course of e.g. transportation of the image processing apparatus.

Further, in making this type of elastic projecting portion, when obtaining at least a pair of elastic projecting portions to be disposed at different grounding portions, it is preferred that these elastic projecting portions be made by cutting an elastic sheet material in such a way as to provide the uneven faces respectively thereto. In this, preferably, the pair of the elastic projecting portions thus obtained are shaped substantially symmetrical to each other relative to the cutting face of the sheet material. Still preferably, these paired elastic projecting portions have a substantially identical shape.

Namely, when the elastic projecting portions are formed by cutting an elastic sheet material so as to provide the uneven faces thereto, the elastic projecting portions are obtained as e.g. rubber blocks by cutting a sheet material, not by forming them in a mold. This provides the advantage of cost reduction. In addition, by appropriately selecting the cutting position, it is possible to obtain elastic projecting portions with assured substantial symmetry while restricting shape difference among these elastic projecting portions.

Further, when a plurality of elastic projecting portions are used and each of these elastic projecting portions has differing sides (long and short sides) in its horizontal cross section (i.e. the cross section parallel to the contact-object surface), preferably, at least one elastic projecting portion is arranged with a longitudinal orientation different from that of at least another elastic projecting portion.

That is, when the elastic projecting portion has differing long and short sides in its horizontal cross section, if a plurality of such elastic portions are all arranged with a same longitudinal orientation, this will result in increased tendency of slippage or displacement of the apparatus body along that same longitudinal orientation when the apparatus body is mounted on a slippery contact-object surface. On the other hand, according to the above-described arrangement proposed by the present invention, the different longitudinal orientations of the horizontal cross sections of the plurality of elastic projecting portions provides improvement in the anti-slippage effect for the apparatus body.

Still preferably, the elastic projecting portion has hardness ranging between 60° and 90° as determined according to JIS K 6301 A and an amount of the projection of the elastic projecting portion from the bottom face of the grounding portion is smaller than an amount of elastic deformation which occurs in the elastic projecting portion if this elastic projecting portion alone supports the entire load of the apparatus body and also larger than ¼ of said elastic deformation amount.

With such setting of the “initial” projection amount, when the apparatus is mounted on a floor surface or the like, bottom faces of all grounding portions will come into contact with the contact-object surface without any additional compression. Accordingly, while the base can be supported and grounded in parallel on the contact-object surface, the elastic projecting portion is compressed to firmly contact the contact-object surface. Consequently, this construction can reliably assure the levelness and parallelism of the apparatus body while achieving very effective non-slippage effect.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Next, preferred embodiments of the invention relating to a support structure of an image processing apparatus will be described. In the following discussion, a copier 1 will be referred to as one example of the image processing apparatus.

[General Construction]

Figure 1:
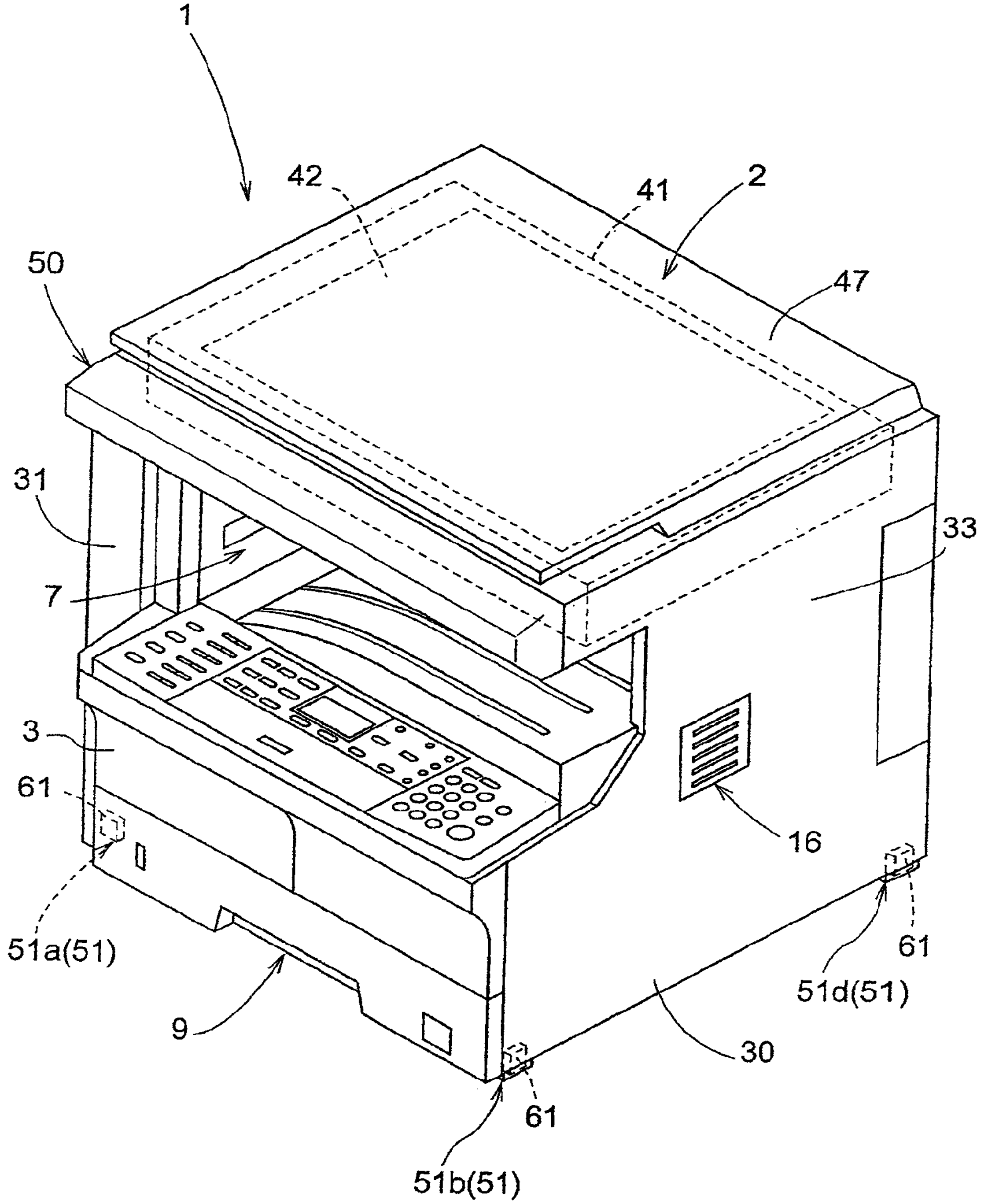
FIG. 1 is a view showing an outer appearance of a copier employing a support structure for an image processing apparatus relating to the present invention.
Figure 2:
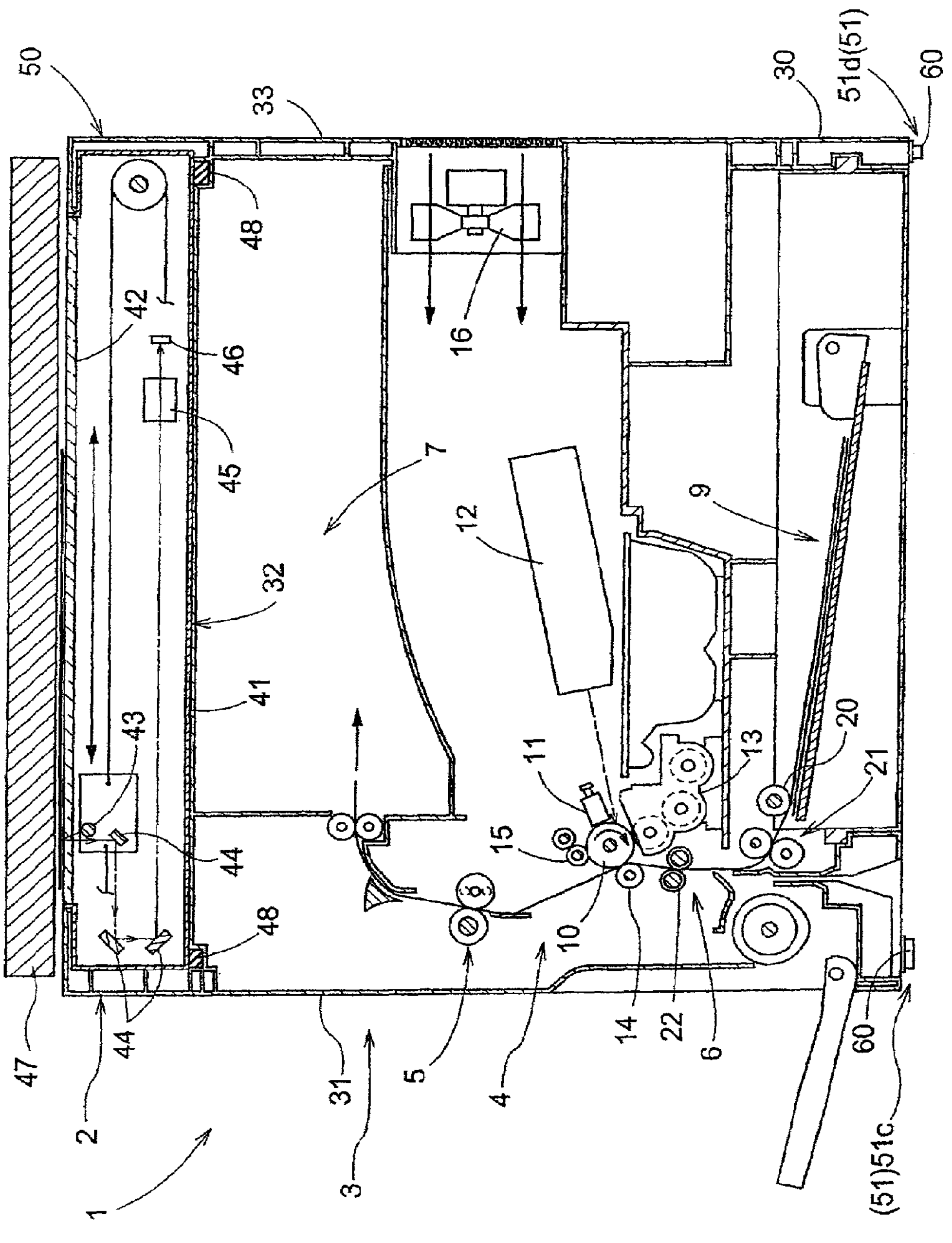
FIG. 2 is a schematic cross section of the image processing apparatus shown in FIG. 1.

FIG. 1 is a schematic appearance view of the copier operating on the electrophotography principle. FIG. 2 shows a schematic cross section of the copier shown in FIG. 1.

The copier 1 includes an image reading unit 2 mounted at an upper portion thereof and a main body 3 downwardly thereof. The main body 3 houses therein an image forming means 4, an image fixing means 5 and a paper conveying means 6. Further, between the main body 3 and the image reading unit 2, there is formed a hollow space provided as a discharge section 7. Downwardly of the main body 3, there is provided a paper accommodating means 9 in which print papers or sheets for forming images thereon are accommodated.

Further, a document (original document) feeder (not shown) can be mounted on the top of the image reading unit 2.

[Image Forming]

Figure 3:
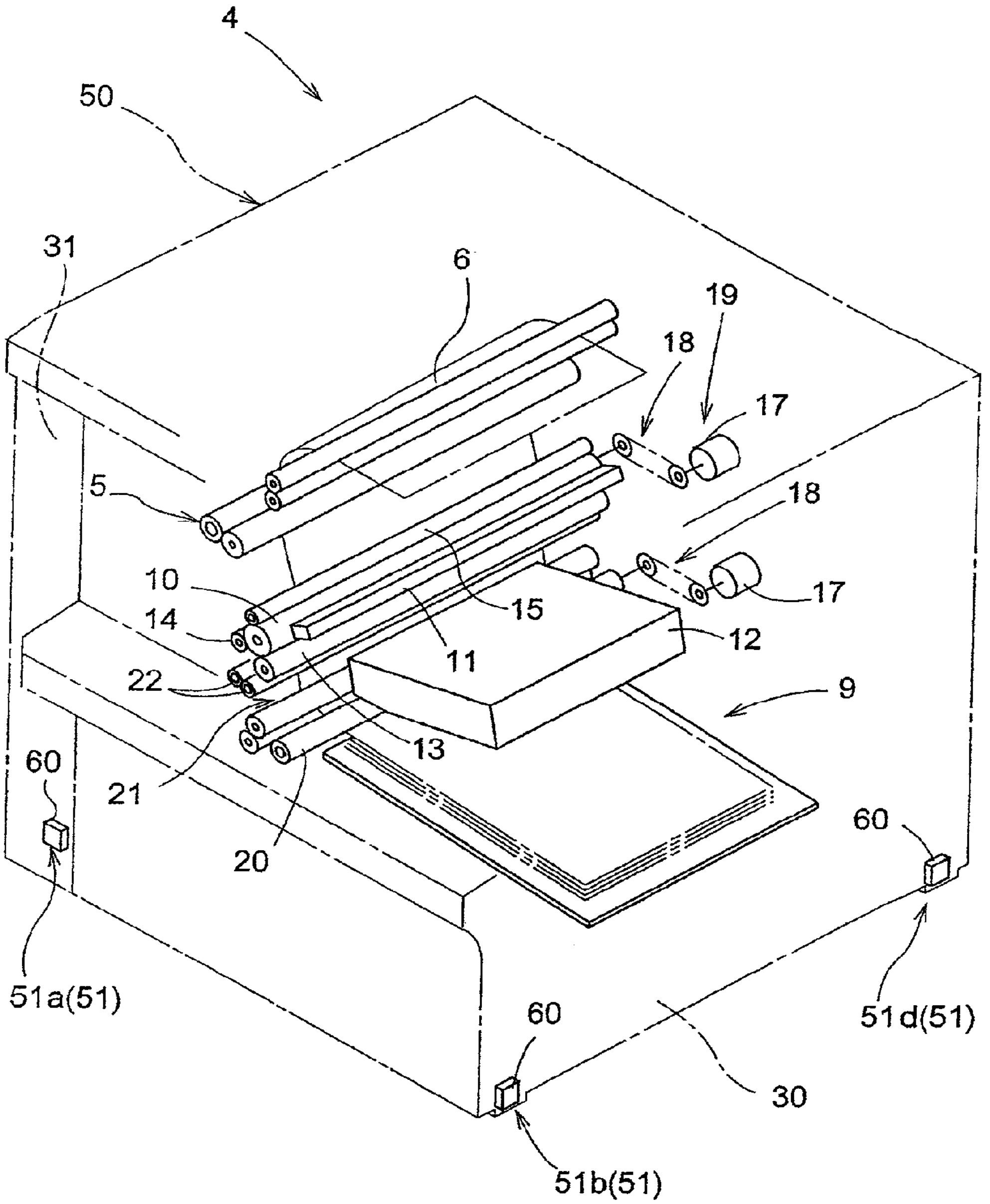
FIG. 3 is a schematic construction view of a driving unit of the image processing apparatus shown in FIG. 1.

As shown in FIGS. 2 and 3, the image forming means 4 includes a cylindrical photosensitive drum 10 and includes also, adjacent and around the drum 10, such components as a charger 11, an exposing unit 12, a developing unit 13, a transfer unit (transfer roller) 14, a cleaning unit 15, etc.

For image formation, an original document set on the image reading unit is exposed with an exposing beam and its reflected image is converted into electric signals by a CCD 46. An electrostatic latent image is formed on the surface of the photosensitive drum 10 charged by the charger 11 and this latent image is then converted into a toner image by the developing unit 13.

On the other hand, the uppermost one of a plurality of paper sheets accommodated in the paper accommodating means 9 is fed to a conveying passage 21 by a paper feed roller 20 and then temporarily stopped by a registering roller 22 for aligning its leading end. Thereafter, the paper sheet is nipped and conveyed between the photosensitive drum 10 and the transfer roller 14, in the course of which the toner image formed on the peripheral surface of the photosensitive drum 10 is transferred to the paper sheet. Then, this paper sheet bearing the un-fixed toner image thereon is conveyed to the fixing means 5, by which the toner image is fused and fixed onto the paper sheet.

In the image forming means, the surface of the photosensitive drum 10 being rotated in one direction is uniformly charged by a corona discharging operation by the charger 11. Then, the exposing unit 12 forms the electrostatic latent image on the photosensitive drum 10 by irradiating a laser beam thereon according to the image signals read by the image reading unit 2 or image information received from the outside from e.g. a computer disposed outside the copier.

In the developing unit 13, a rotatable developing sleeve is disposed with a small gap relative to the photosensitive drum 10, so that the toner is caused to magnetically adhere to the electrostatic latent image by means of a magnetic brush. As described above, the transfer roller 14 transfers the toner image from the drum surface onto the paper sheet.

The cleaning unit 15 includes a scraper blade for coming into contact with the surface of the photosensitive drum, thus scraping off or collecting any toner remaining thereon.

The apparatus body, as shown in e.g. FIG. 2, comprises an integrated assembly of a lower base 30, an image-forming frame 31 and a reinforcing member 33. And, an image reading unit as the image reading unit 2 is mounted and connected to the top of this apparatus body.

The base 30, the image-forming frame 31 and the reinforcing member 33 are formed integrally of such material as polyphenylene ether (PPE resin), ABS resin or the like.

The image-forming frame 31 mounts a mechanism for positioning and supporting the image forming means 4 and a guide member for guiding attachment and detachment of the image forming means 4.

As shown in FIGS. 2 and 3, the image-forming frame 31 detachably mounts the image fixing means 5 at an upper portion thereof and mounts also, at a right portion thereof, the exposing means 12 and a cooling fan 16. The frame 31 further mounts, at a rear portion thereof, the image forming means 4, the fixing means 5, and a driving unit 19 including motors 17 for rotatably driving and the paper conveying means 6 and driving mechanisms 18 which motors 17 and mechanisms 18 being attached to a side plate member. In this copier 1 relating to the present invention, the driving unit 19 is mounted at the left inner side of the apparatus body, so that its center of the gravity is offset to that side. Hence, it is important to cope with this.

[Image Reading]

Figure 4:
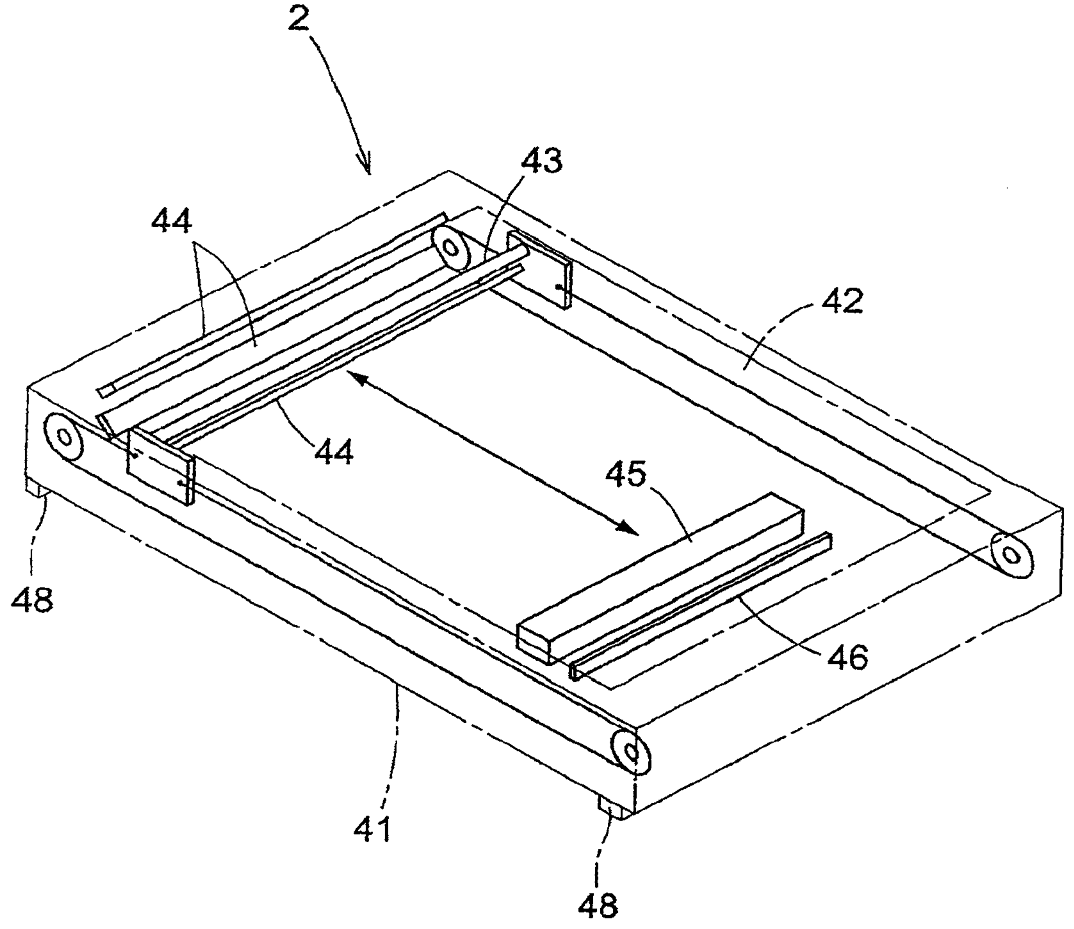
FIG. 4 is a schematic appearance view of an image reading unit.

FIG. 4 is a schematic appearance view of the image reading unit 2. FIG. 2 is a schematic cross section of the same.

This image reading unit 2 includes a box-like structure frame 41 having an open top. On this open side, there is mounted a contact glass 42 and an original pressing means 47 (see FIG. 1) which can be opened and closed is disposed in opposition thereto. Within an inner space downwardly thereof, there are arranged a light source 43, a mirror unit 44, a lens unit 45 and the CCD 46.

The light source 43 is movable to the right or the left as being guided by a guide member (not shown) included in the structure frame and is moved by a driving mechanism (not shown) disposed rearwardly of the apparatus to scan an original document placed on the contact glass 42.

Light beam reflected by the original is then reflected by the mirror and the mirror unit 44 to be impinged on the lens unit 45 to from an image on the CCD 46, in which the image is converted into electric signals to be outputted therefrom. The structure frame 41 comprises a component formed of a resin material such as ABS.

Adjacent the four corners of the bottom face of the structure frame 41, there are provided pads 48 formed of e.g. EPDM rubber (see FIG. 2). When mounted to the apparatus body, these pads 48 come into contact with a ceiling face of the apparatus body for supporting the image reading unit 2.

[Support Structure for the Apparatus Body]

Next, the support structure for the apparatus body 50 relating to the present invention will be detailed with reference to FIGS. 5-8.

Figure 5:
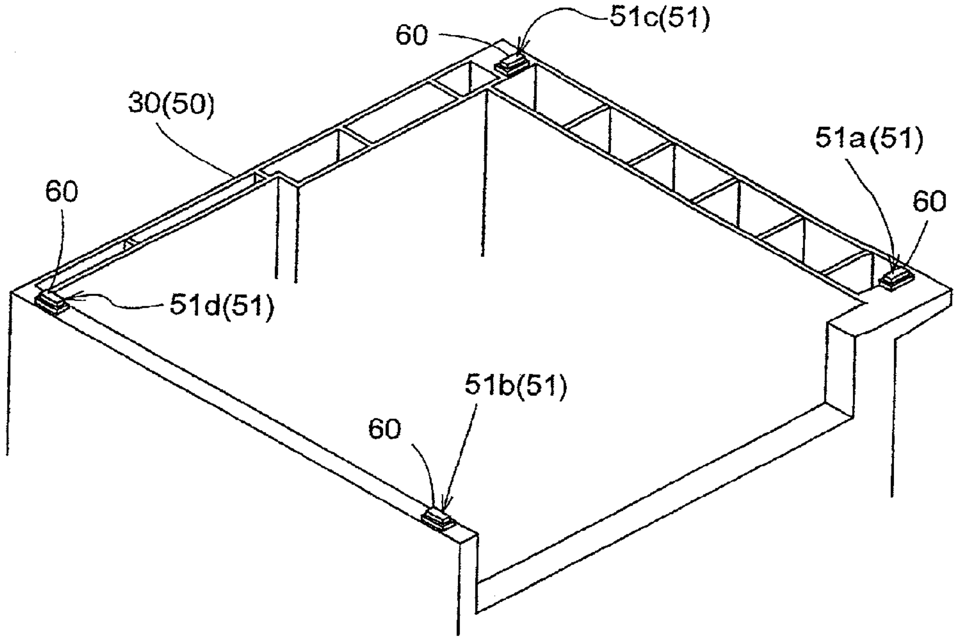
FIG. 5 is a view showing the image processing apparatus of FIG. 1 as seen from its bottom.
Figure 6:
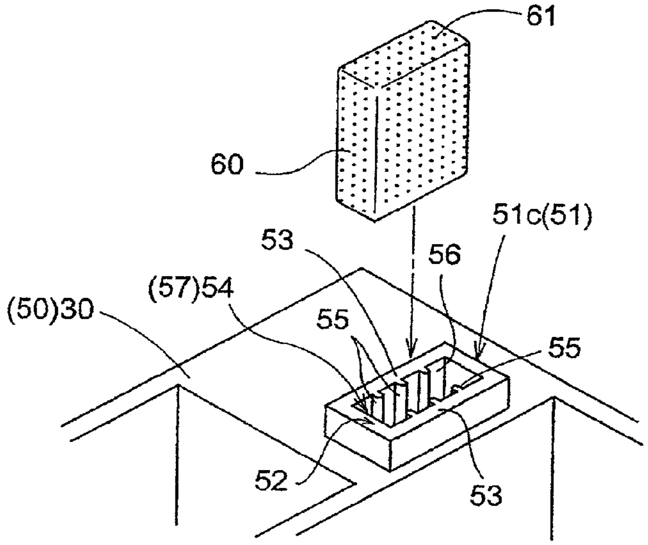
FIG. 6 is an explanatory view illustrating a press-fitting construction for an elastic projecting portion into an accommodating hole.
Figure 7:
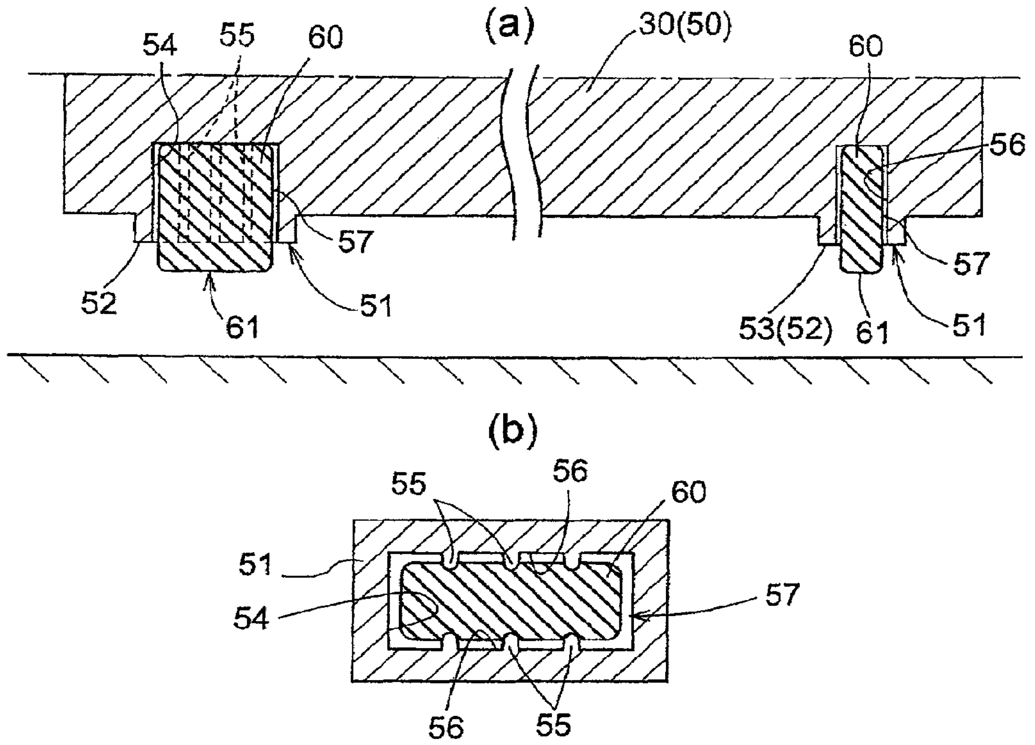
FIG. 7 is an explanatory view showing a condition of the elastic projecting portion under a non-grounded condition.

In these figures, FIG. 5 shows the apparatus 1 as seen from its bottom face, the apparatus having press-fitted elastic projecting members 60. FIG. 6 shows a condition before the elastic projecting member 60 is accommodated within an accommodating hole 54. FIG. 7 shows free or un-compressed condition of the elastic projecting members 60 when the apparatus 1 is not placed on a floor surface or the like (ungrounded condition). Whereas, FIG. 8 shows a grounded condition of the apparatus 1.

Figure 8:
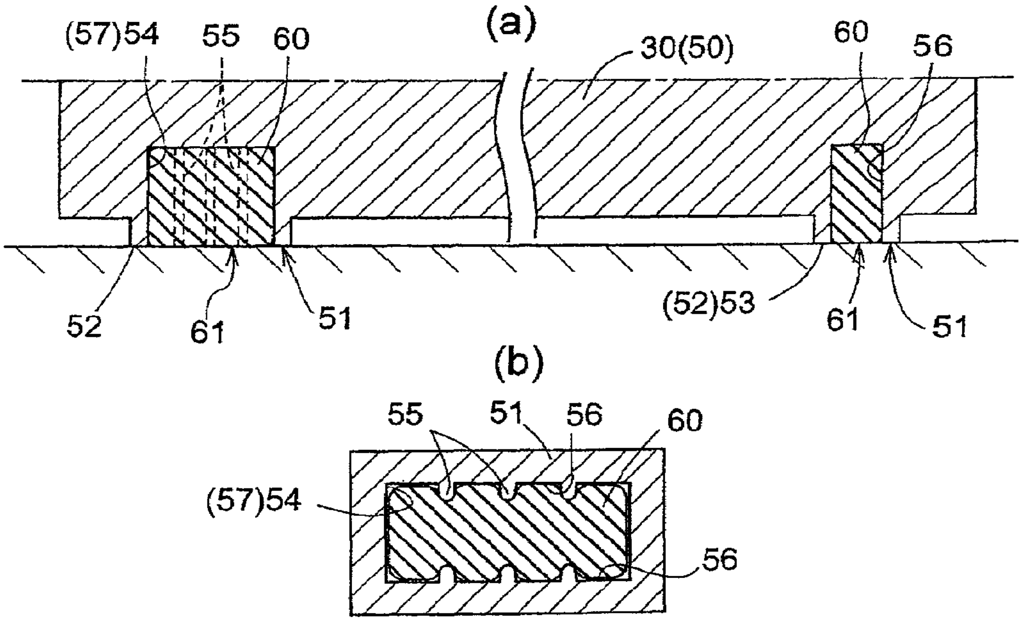
FIG. 8 is an explanatory view showing a condition of the elastic projecting portion under a grounded condition.

Further, in these FIGS. 7 and 8, (a) are vertical cross sections showing grounding portions and their vicinity and (b) are horizontal cross sections showing one grounding portion including the press-fitted elastic projecting member 60 and its vicinity.

As shown in FIG. 5, the base 30 provided integrally at the lower portion of the apparatus body has basically an angular hooked outer shape.

Adjacent the four corners of the bottom face of this base 30, there are provided a plurality of grounding portions 51 characterizing the present invention. As shown in FIG. 6, this grounding portion 51 is formed as a one-step downward projection which projects partially from the bottom face of the apparatus body 50. Hence, the apparatus body is to be grounded on a floor surface or the like at the four corners thereof.

Referring back to FIG. 5, the grounding portions 51 include a front-left grounding portion 51*a*, a front-right grounding portion 51*b*, a rear-left grounding portion 51*c* and a rear-right grounding portion 51*d*. In this, the right and left of the apparatus correspond to the right and left of the plane of FIG. 2 determined by the posture of a user facing the apparatus.

In this embodiment, by means of a construction described below, the leveling of the base 30 is achieved by means of these grounding portions 51 which are formed of the relatively rigid resin material integrally with the base 30.

As shown in FIG. 6, the bottom face of the grounding portion 51 includes a pair of parallel grounding face portions 53 extending longitudinally in the plan view. Respecting the left grounding portions (both the front and rear ones) 51*a* and 51*c*, the parallel grounding face portions 53 extend longitudinally in the right and left direction. Whereas, regarding the right grounding portions (both the front and rear ones) 51*b* and 51*d*, the parallel grounding face portions 53 extend longitudinally in the front and rear direction.

The above-described orientations apply also to the horizontal cross section and the longitudinal arrangement of the elastic projecting members 60 to be detailed later.

Each grounding portion 51 retains therein the rectangular column like elastic projecting member 60 press-fitted therein.

More particularly, in each grounding portion 51, more than an upper half portion of the elastic projecting member 60 is accommodated within the grounding portion 51, whereas the remaining lower portion of the member 60 projects downwardly therefrom under the non-grounded condition (i.e. when the apparatus body is afloat the floor surface) shown in FIG. 7.

Further, as shown in FIG. 6, FIG. 7(*b*) and FIG. 8(*b*), the accommodating hole 54 of the grounding portion 51 into which the elastic projecting member 60 is pressed includes, along the inserting direction of the member, an array of three ribs 55 formed on each of a pair of opposed longitudinal wall faces 56, with the ribs projecting into the inner space of the hole. When the elastic projecting member 60 is pressed into the accommodating hole 54, the elastic projecting member 60 is partially compressed by these ribs 55, thereby to retain the elastic projecting member 60 firmly.

Referring to the shape of these elastic projecting member 60, each member 60 is formed by being cut from an elastic sheet material so that three direction sides of the cut member in the form of a rectangular column have different lengths from each other and also that each corresponding face of thus formed plural elastic projecting members 60 exhibit a same material property in the direction of that face. Specifically, in the case of the example shown in FIG. 7, the vertical directions of the elastic projecting members 60 are rendered identical to each other with respect to the direction of cutting thereof from the same elastic sheet material. Hence, relative to the longest direction (i.e. the vertical direction as the members are press-fitted within the respective grounding portions 51) of the elastic projecting portions 60 in which the compressive deformation of these elastic projecting members 60 mainly occurs, the members 60 exhibit substantially same material elastic property, so that these elastic projecting members 60 may provide a substantially equal grounding (surface-abutting) pressure in association with the elastic compressive deformation thereof.

As described hereinbefore, the parallel grounding face portions 53 extend longitudinally in the right and left direction in the case of the left grounding (both the front and rear ones) 51*a* and 51*c* whereas these parallel ground face portions 53 extend longitudinally in the front and rear direction in the case of the right (both the front and rear ones) grounding portions 51*b* and 51*d*. And, each of these grounding portions 51*a*-51*d* retains therein the elastic projecting member 60 press-fitted therein and formed as a rectangular column having different lengths in the three sides thereof.

Then, the grounding portions 51 are arranged such that the longitudinal orientation of at least one elastic projecting member 60 in its horizontal cross section is different from that of at least another elastic projecting member 60. More particularly, in the case of the exemplary construction shown in FIG. 5, the elastic projecting members 60 included in the left grounding portions (both the front and rear ones) 51*a* and 51*c* are longitudinally aligned with the right and left direction whereas the elastic projecting members 60 included the right grounding portions (both the front and rear ones) 51*b* and 51*d* are longitudinally aligned with the front and rear direction. This arrangement achieves improvement in the anti-slippage effect for the apparatus body 50 mounted on the floor surface or the like in e.g. the four directions normal to the respective sides of the rectangular or square apparatus body 50.

The elastic projecting member 60 can be formed generally as a member formed of ethylene propylene (EPDM) rubber. This material can have hardness of 60° to 90°. In this embodiment, the material having hardness of 60° is employed. This hardness value of the elastic material is a rubber hardness value determined according to JIS K 6301 A. The material having such hardness is not limited to EPDM rubber. Such materials are readily available from among various types of rubber or synthetic material such as polyurethane.

Next, the specific shape (especially the projection amount) of the elastic projecting member 60, appropriate choice of elastic property thereof and the construction of the bottom of the grounding portion will be detailed with reference to FIGS. 7 and 8.

As shown in e.g. FIG. 7(*a*), the bottom faces 52 of the respective grounding portions 51 together form a single horizontal plane. That is, when the copier 1 is mounted on a horizontal floor or table surface, as shown in FIG. 8, all of these bottom faces 52 of the grounding portions 51 adjacent the four corners come into contact with the surface (contact-object surface), thereby to be able to support the copier 1 horizontally. Under this grounded condition, these bottom faces mainly support the load of the apparatus body.

Referring next to the elastic projecting member 60, when the apparatus 1 is grounded on the floor surface (contact-object surface), as shown in FIG. 8, this elastic projecting member 60 is elastically deformed so that based on the load applied the respective portions thereof, the ground-contacting face 61 at the leading end of the bottom becomes flush with the bottom face 52 of the grounding portion, hence, both the ground-contacting face 61 of the elastic projecting member 60 and the bottom face 52 of the grounding portion are grounded on the floor surface (example of contact-object surface).

Further, in order to allow the elastic deformation described above, as shown in FIG. 7(*b*), between the grounding portion 51 and the elastic projecting member 60, there is formed a deformation allowing gap 57 for allowing the deformation of the elastic projecting member 60 which occurs in the source of shift from the non-grounded condition and the grounded condition.

Also, as may be understood from the mode of deformation shown in sequence in FIG. 7 to FIG. 8 occurring in association with the grounding operation, under the non-grounded condition, the projecting condition of the projecting member 60 is maintained under the non-grounded condition. When grounded, the respective grounding portions 51 come into direct contact with the floor surface, thereby to assure the levelness of the base 30, hence, of the entire apparatus body 50 thanks to the rigidity of these portions 51.

[Levelness Achieved by the Invention's Structure]

Regarding the degree of levelness achieved by employing the invention's support structure described above, an experiment was conducted as follows. In this experiment, the construction of the image processing apparatus employed was identical to that described hereinbefore in connection with the prior art.

In this experiment example, the initial projection amount of each elastic projecting member 60 was set as 0.5 mm. When the apparatus 1 was placed on a floor surface (contact-object surface), compression by this amount of projection occurred at all of the four positions.

Specifically, on the rear-left side, 2 mm compression would occur if the elastic projecting member 60 alone supported the load of the apparatus body 50 without using the rigid grounding portion 51. On the other hand, in the case of the invention's construction employed in this example, when the elastic projecting member 60 were compressed by 0.5 mm, the bottom faces 52 of the grounding portion at this portion came into contact with the floor surface and no further compression occurred in the elastic projecting member 60. On the rear-right side and the front-left side, 1 mm compression would occur. In the case of the invention's construction, however, just when 0.5 mm compression occurred, the bottom faces 52 of the grounding portion at this portion came into contact with the floor surface and no further compression occurred in the elastic projecting member 60. Further on the front-right side, 0.5 mm compression would occur regardless of the presence or absence of the grounding portion 51. Hence, in this example too, just when 0.5 mm compression occurred, the bottom face 52 of the grounding portion came into contact with the floor surface. That is, in this example, an amount of the initial projection of the elastic projecting member 60 from the bottom face 52 of the grounding portion 51 is set smaller than an amount of elastic deformation which occurs in the elastic projecting member 60 if this elastic projecting member 60 alone supports the entire load of the apparatus body 50 and also larger than ¼ of said elastic deformation amount.

With such projection amount setting above, under the grounded condition of the apparatus, the bottom faces 52 of all of the grounding portions 51 are in contact with the floor surface and no further compressive deformation occurs in the elastic projecting members 60. As a result, there was achieved a same degree of levelness in the mounting face for the optical unit as that achieved when the rigid resin bases alone were used.

Further, under the above-described condition, within all the grounding portions 51, the respective elastic projecting members 60 were sufficiently compressed to firmly contact the floor surface. Thus, their anti-slippage effect was not impaired.

As described above, with this construction, levelness and parallelism for the optical unit were ensured without losing or impairing the original function of the elastic material.

[Other Modes of Embodying the Ground-Contacting Face of the Elastic Projecting Portion]

Figure 9:
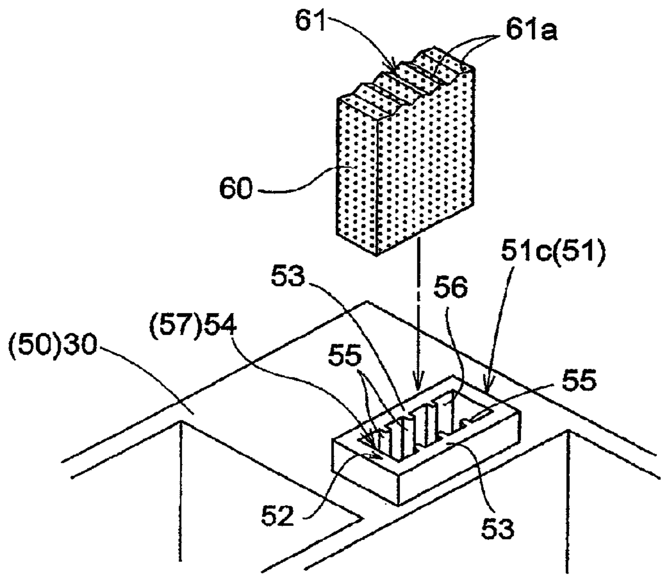
FIG. 9 is a view showing the image processing apparatus as seen from its bottom, the apparatus having elastic projecting portions relating to a further embodiment of the invention.
Figure 10:
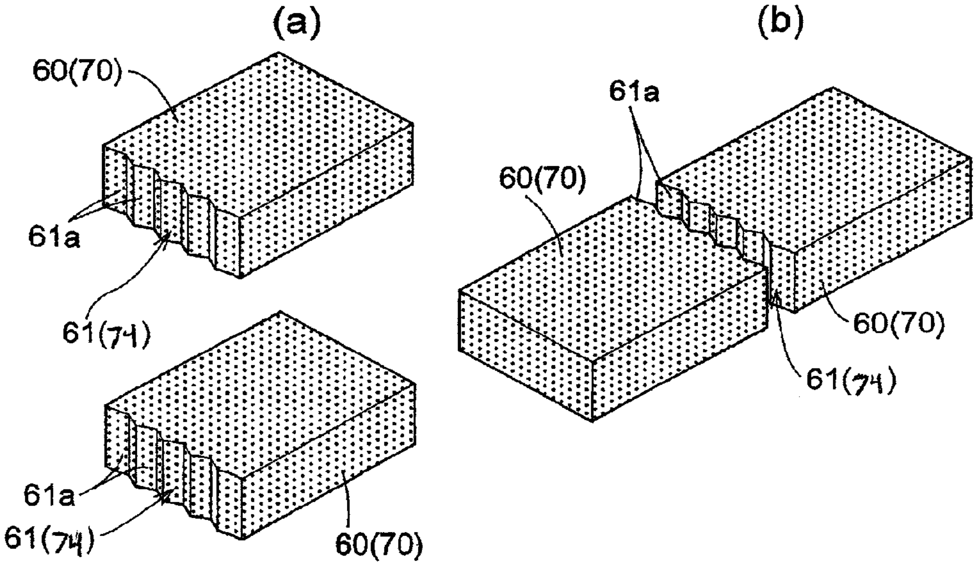
FIG. 10 is a view showing a specific construction and a making process of an elastic projecting portion relating to a further embodiment.

In the foregoing discussion, the ground-contacting face 61 of the elastic projecting member 60 was formed as a simple flat face. Instead, as shown in FIGS. 9 and 10, this face can be formed with a predetermined unevenness (wave-like uneven in the illustrated example). This is additionally effective for avoiding inadvertent detachment of the elastic projecting member 60 when this face firmly contact the floor surface.

FIG. 9 shows a condition when this type of elastic projecting member 60 is attached to its disposing position in correspondence with FIG. 6. FIG. 10(*a*) shows the shape of this elastic projecting member 60 and FIG. 10(*b*) shows a condition thereof when it was formed by cutting.

As shown in FIG. 10(*a*), in this example, the ground-contacting face 61 of the elastic projecting member 60 has the predetermined unevenness comprising combination of a plurality of inclined faces 61 a relative to the direction closer to and away from the contact-object surface which typically is a floor surface. Therefore, when this member is employed, the projections of the unevenness will contact the floor surface under the grounded condition.

As shown in FIG. 10(*b*), for manufacturing this type of elastic projecting member 60 having such ground-contacting face 61 described above, an elastic sheet material 70 can be cut so as to form the wave-like unevenness. In this case, the cutting shape should be chosen such that a pair of elastic projecting members 60 to be formed by cutting the material across a cutting face 74 may have an identical shape to each other.

This arrangement achieves advantageous cost reduction. Further, appropriate choice in the cutting face position, it is possible to restrict any shape difference among the elastic projecting members 60 to be produced as well as to assure substantially identical elastic property thereof.

[Other Embodiments]

Other embodiments of the invention will be described next.

(1) In the foregoing embodiment, the image processing apparatus has the functions of both image forming and image reading. The invention's support structure is useful and effective also for supporting an image processing apparatus which provides only either one of these functions.

(2) In the foregoing embodiment, the grounding portion includes the elastic projecting member. And, under the grounded condition, both the bottom face of the grounding portion and the ground-contacting face of the elastic projecting member come into contact with the floor surface (contact-object surface). However, for coping with the problem of inadvertent detachment of the elastic projecting member in the course of dragging or lifting up after a long period of installment, it is not absolutely needed for the bottom face of the grounding portion to come into contact with the floor surface.

For this reason, in this invention, the portion provided to the base of the apparatus body for retaining the elastic projecting member whose ground-contacting face comes into contact with the floor surface can be referred to as "retaining portion". In the context of this invention, this retaining portion means a portion for retaining the elastic projecting member or portion.

(3) In the foregoing embodiment, the invention's support structure was realized by press-fitting the elastic projecting member into the grounding portion. Alternatively, in the manufacture of this support construction, an elastic material having elasticity suitable for achieving the object of this invention can be formed integrally with the resin material forming the grounding portion (i.e. forming the apparatus body). Therefore, any such portion which has greater elasticity than the grounding portion and which becomes flush with the grounding portion under the grounded condition is referred to as the "elastic projecting portion" herein.

This concept of elastic projecting portion applies also to the "retaining portion" described above. It is reminded, however, that in the case of the retaining portion, the establishment of flush condition between this retaining portion and the elastic projecting portion is not essentially required.

(4) The construction for retaining the elastic projecting portion is not limited to the press-fitting construction described above. This can be any construction capable of retaining the projecting portion to the grounding portion (or retaining portion).

(5) In the foregoing embodiment, each grounding portion defines a hole for accommodating the elastic projecting member therein and the elastic projecting member is press-fitted therein, thereby to realize the support structure of this invention. Instead, the elastic projecting member can be placed away from or independently of the grounding portion.

Figure 11:
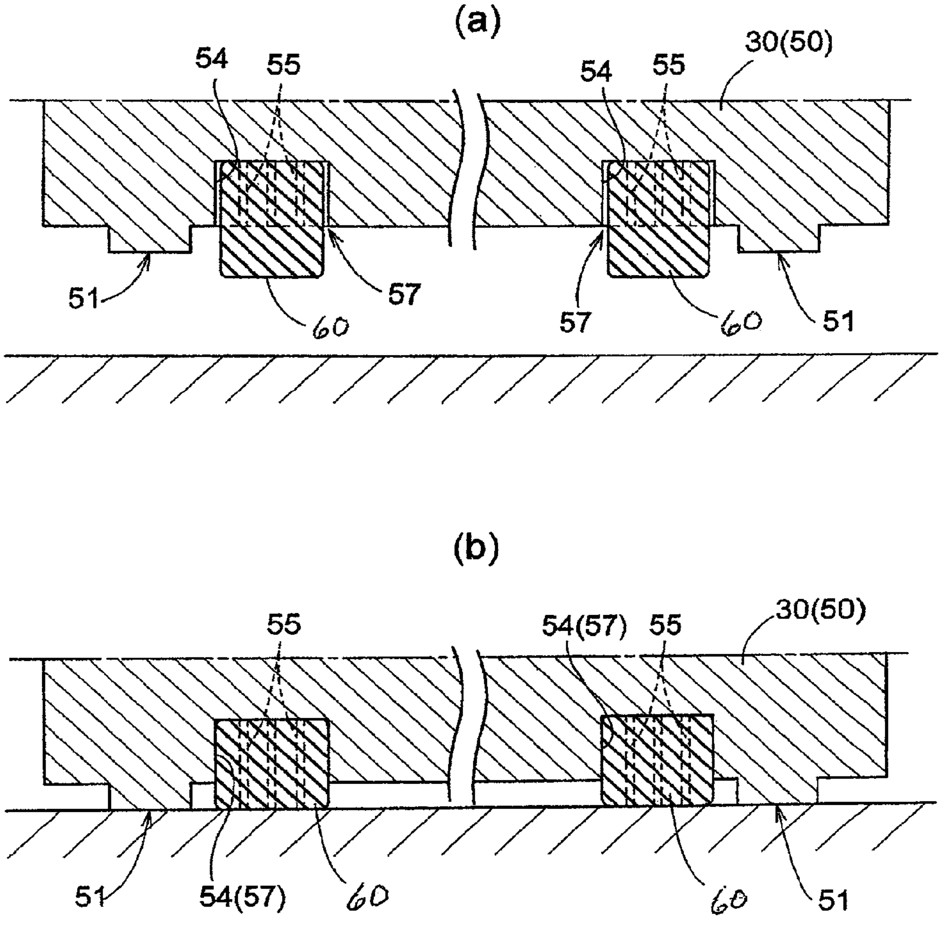
FIG. 11 is a view showing a construction relating to a further embodiment of the invention under a non-grounded condition and a grounded condition.

FIG. 11 shows an example of such modified construction in which the elastic projecting portions 60 are provided independently of the grounding portions 51. FIG. 11(*a*) shows the un-grounded condition and FIG. 11(*b*) shows the grounded condition of this modified support structure. In this particular example, the elastic projecting portions 60 are provided independently on the inner side (in the plan view) of the respective grounding portions which are disposed adjacent the four corners.

(6) In the foregoing embodiment, as shown in FIG. 7(*b*) and FIG. 8(*b*), the elastic projecting member is allowed to be elastically deformed in the direction of substantially horizontal cross section. Instead, a gap or a space for providing such deformation allowing function may be provided adjacent the top face of an accommodating hole extending in the vertical direction of the apparatus, so that its elastic deformation may be allowed in the vertical direction. Further alternatively, the elastic deformation may be allowed in both the horizontal and vertical directions. The construction of providing such deformation allowing space is applicable also to the "retaining portion" defined above.

Figure 12:
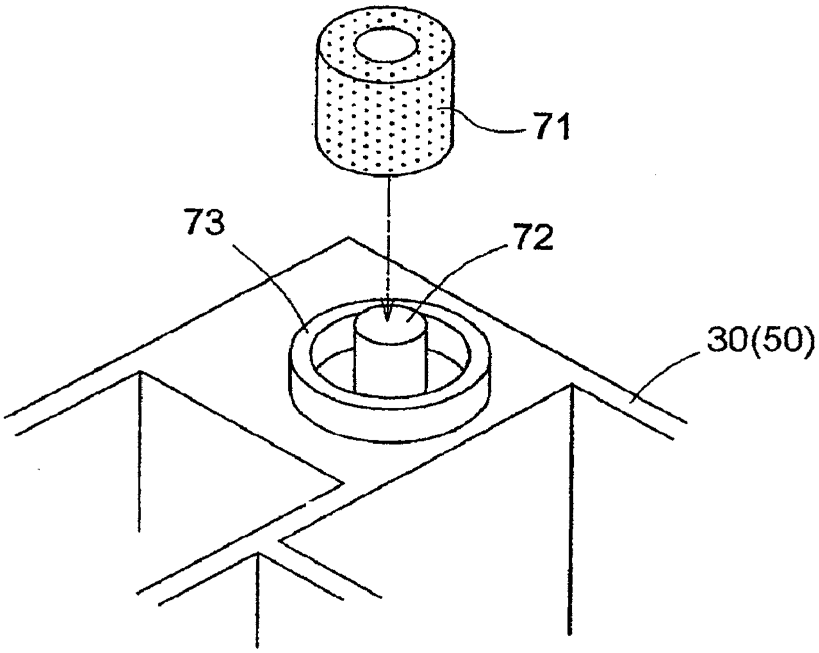
FIG. 12 is a view showing a still further embodiment of the present invention having a cylindrical elastic projecting portion.

(7) In the foregoing embodiment, the elastic projecting member was formed as an angular column. Instead, as shown in FIG. 12, this elastic projecting member can be formed as a cylindrical member 71 just like the member conventionally employed. In this illustrated example, a projecting cylinder located at the axis of a hollow cylinder constitutes the "grounding portion" referred to in this invention. The cylindrical elastic projecting member 71 has an inner diameter which is slightly smaller than an outer diameter of a cylindrical projection 72, so that the elastic projecting member 71 can be reliably fixed and retained in position due to the elastic deformation occurring therein.

Figure 13:
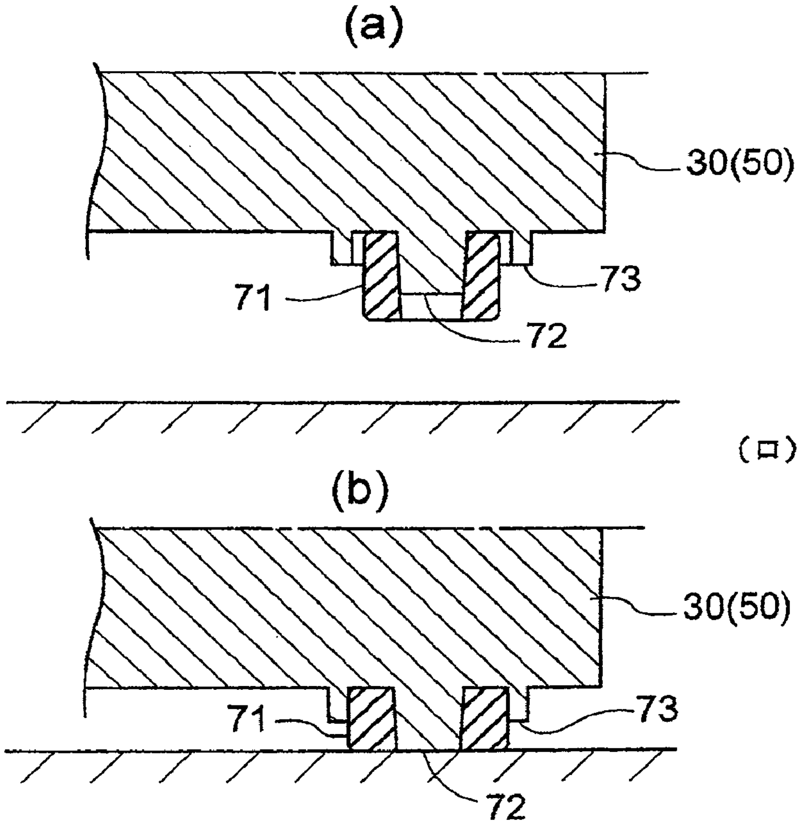
FIG. 13 is a view showing the construction of FIG. 12 relating to the further embodiment under a non-grounded condition and a grounded condition.

Further, on the radially outer side of the above, there is provided an annular retaining portion 73 projecting from the apparatus body for preventing excessive amount of elastic deformation in the elastic projecting member 71. FIG. 13(*a*) shows the non-grounded condition and FIG. 13(*b*) shows the grounded condition.

A similar construction can be used for the "retaining portion". Namely, this retaining portion can be formed as a projecting column while the elastic projecting portion can be formed as a hollow cylindrical portion. In this case too, the grounding (contact with the floor surface or contact-object surface) of the retaining portion is not required.

Figure 14:
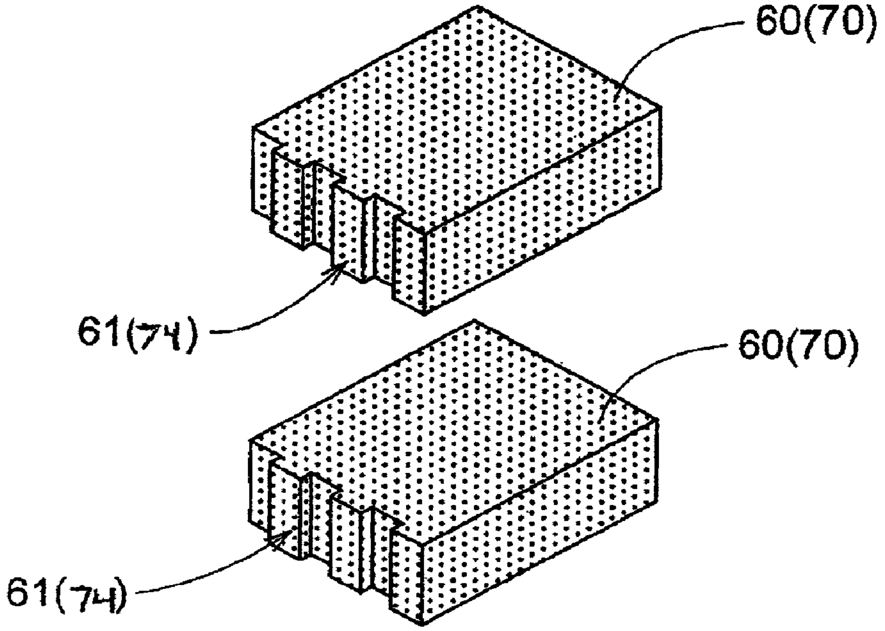
FIG. 14 is a view showing a specific construction and a making process of an elastic projecting portion relating to a further embodiment.
Figure 14:
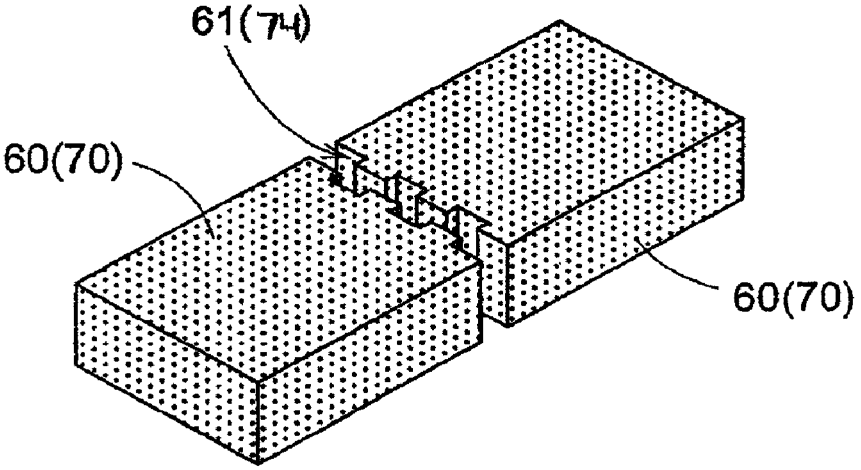

(8) In the foregoing embodiment, as an example of the unevenness of the ground-contacting face 61 of the elastic projecting member 60, this was described as wave-like pattern. Instead, as shown in FIGS. 14(*a*) and (*b*), this can be a simple rectangular shape. FIG. 14 employs a similar illustration method to that employed for FIG. 10.

Moreover, instead of forming the face with such predetermined unevenness, it is also possible to just roughen its surface or carry out a certain operation such as knurling operation to the surface for achieving a similar effect.

Lastly, the invention's support structure for an image processing apparatus can be used for a copier, etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A support structure for an image processing apparatus having an apparatus body, a base provided at a lower portion of the apparatus body for supporting the body, and an image processing unit disposed inside the apparatus body or attached thereto, the unit being capable of effecting at least either an image forming operation or an image reading operation, the structure comprising:

a grounding portion having a bottom face for coming into contact with a contact-object surface, said grounding portion being formed at the bottom of the base;

an elastic projecting portion formed of a material having greater elasticity than a material forming said grounding portion; said elastic projecting portion being provided in said grounding portion, said elastic projecting portion having a ground-contacting face for coming into contact with the contact-object surface;

under a non-contacting condition of said elastic projecting portion relative to said contact-object surface, said ground-contacting face projecting from a bottom face of said grounding portion;

under a contacting condition of said elastic projecting portion relative to said contact-object surface, said elastic projecting portion being elastically deformed, so as to allow said grounding portion to come into contact with said contact-object surface; and under a grounded condition of said grounding portion, said grounding portion coming into contact with only a portion and not all of said elastic projecting portion in a direction along said contact-object surface to said contact-object surface.

2. The support structure according to claim 1, wherein between the grounding portion and the elastic projecting portion, there is provided a deformation-allowing gap for allowing deformation of the elastic projecting portion which occurs between the non-grounded condition and the grounded condition in a direction along said contact-object surface.

3. The support structure according to claim 1, wherein the elastic projecting portion is retained under its compressed state by the grounding portion.

4. A support structure for an image processing apparatus having an apparatus body, a base provided at a lower portion of the apparatus body for supporting the body, and an image processing unit disposed inside the apparatus body or attached thereto, the unit being capable of effecting at least either an image forming operation or an image reading operation, the structure comprising:

a grounding portion having a bottom face for coming into contact with a contact-object surface, said grounding portion being formed at the bottom of the base, said grounding portion includes an accommodating hole having a rib on an inner wall face thereof;

an elastic projecting portion formed of a material having greater elasticity than a material forming said grounding portion; said elastic projecting portion being provided in said grounding portion, said elastic projecting portion having a ground-contacting face for coming into contact with the contact-object surface, said elastic projecting portion being press-fitted within said accommodating hole under a non-contacting condition of said elastic projecting portion relative to said contact-object surface, said ground-contacting face projecting from a bottom face of said grounding portion;

under a contacting condition of said elastic projecting portion relative to said contact-object surface, said elastic projecting portion being elastically deformed, so as to allow said grounding portion to come into contact with said contact-object surface;

under a grounded condition of said grounding portion, said grounding portion coming into contact with only a portion and not all of said elastic projecting portion in a direction along said contact-object surface to said contact-object surface;

under the grounded condition of the grounding portion relative to the contact-object surface, said rib of the grounding portion comes into contact with said portion of said elastic projecting portion in the direction along said contact-object surface to said contact object surface.

* * * * *